No. 736,432. PATENTED AUG. 18, 1903.
R. B. OWENS.
APPARATUS FOR ASCERTAINING POSITION RELATIVE TO A
PREARRANGED GUIDING SYSTEM.
APPLICATION FILED MAR. 11, 1902.

NO MODEL. 4 SHEETS—SHEET 1.

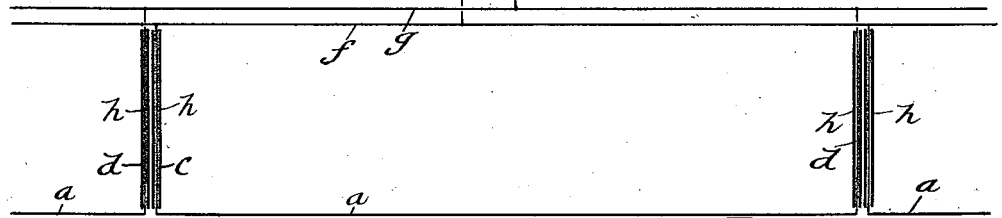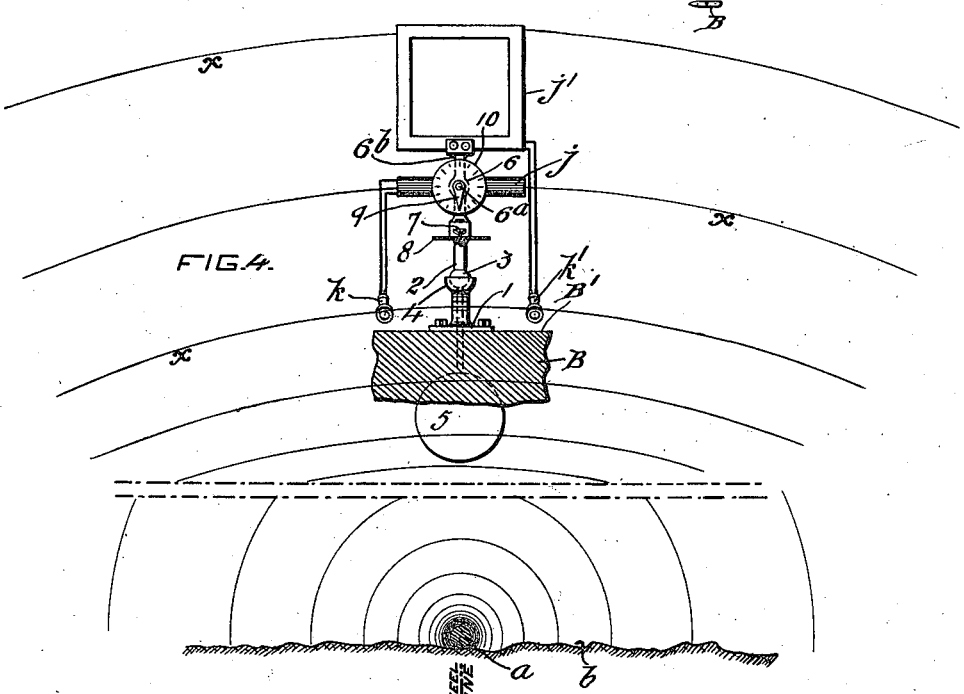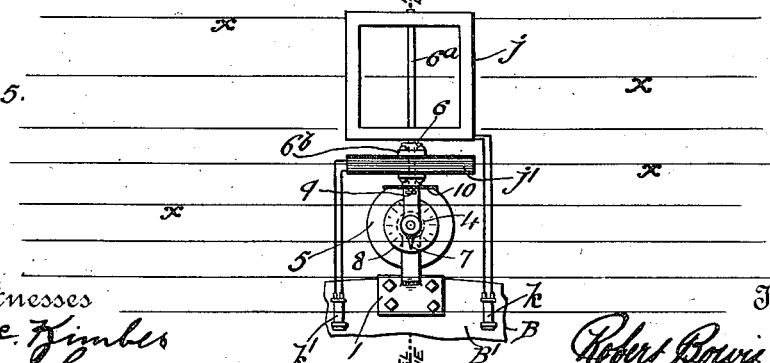

No. 736,432. PATENTED AUG. 18, 1903.
R. B. OWENS.
APPARATUS FOR ASCERTAINING POSITION RELATIVE TO A PREARRANGED GUIDING SYSTEM.
APPLICATION FILED MAR. 11, 1902.
NO MODEL. 4 SHEETS—SHEET 3.
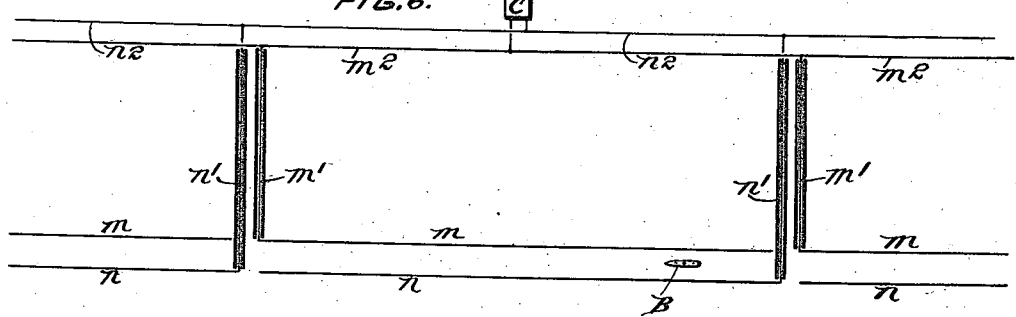
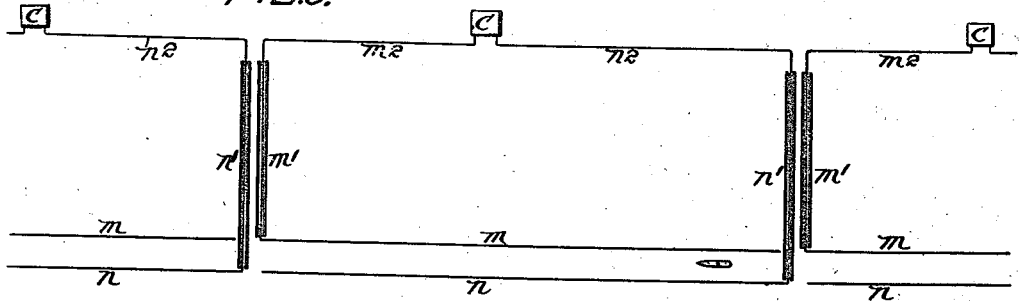

No. 736,432. PATENTED AUG. 18, 1903.
R. B. OWENS.
APPARATUS FOR ASCERTAINING POSITION RELATIVE TO A
PREARRANGED GUIDING SYSTEM.
APPLICATION FILED MAR. 11, 1902.
NO MODEL.
4 SHEETS—SHEET 4.

No. 736,432. Patented August 18, 1903.

UNITED STATES PATENT OFFICE.

ROBERT BOWIE OWENS, OF MONTREAL, CANADA.

APPARATUS FOR ASCERTAINING POSITION RELATIVE TO A PREARRANGED GUIDING SYSTEM.

SPECIFICATION forming part of Letters Patent No. 736,432, dated August 18, 1903.

Application filed March 11, 1902. Serial No. 97,799. (No model.)

*To all whom it may concern:*

Be it known that I, ROBERT BOWIE OWENS, of the city of Montreal, in the district of Montreal and Province of Quebec, Canada, have invented certain new and useful Improvements in Apparatus for Ascertaining Position Relative to a Prearranged Guiding System; and I do hereby declare that the following is a full, clear, and exact description of the same.

My invention contemplates a method of ascertaining position relative to a prearranged guiding system; and it has for its object to provide means whereby a vessel or other moving body may be guided in a predetermined course.

The invention, broadly expressed, may be said, briefly, to consist in arranging an agent capable of creating an active field in a position relative to the course to be followed by the vessel or other body, to have said vessel within such field, means adapted to be affected by such field being provided whereby the steersman may ascertain if the vessel deflects from its course.

More specifically, the invention calls for the establishment of a guiding system comprising one or more magnetic or electric fields the character of which admit of ascertainment, through suitable instruments, of the vessel's position.

For full comprehension, however, of my invention references must be had to the accompanying drawings, forming a part of this specification, in which like symbols indicate the same parts, and wherein—

Figure 1:
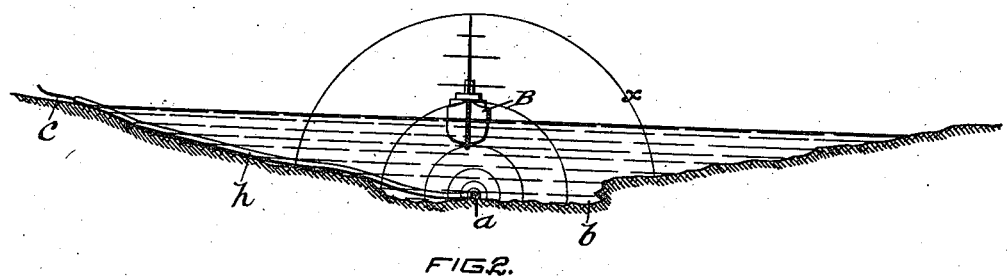
Figure 2:
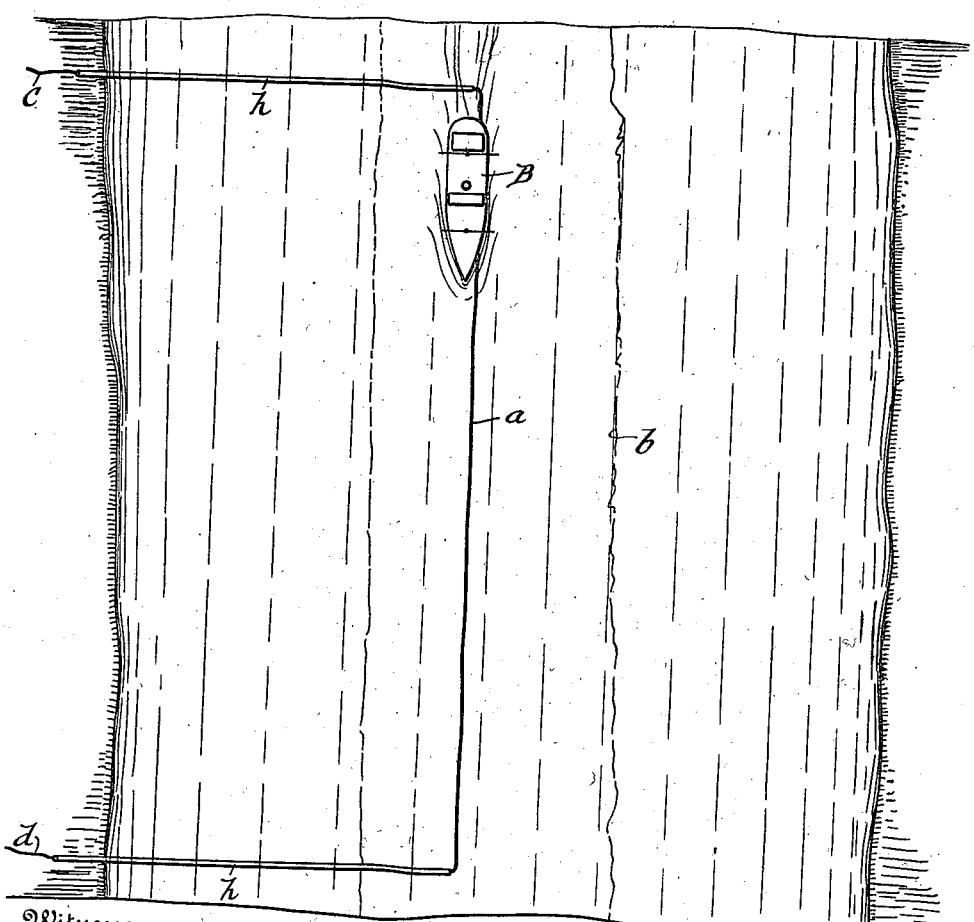
Figures 7, 8:
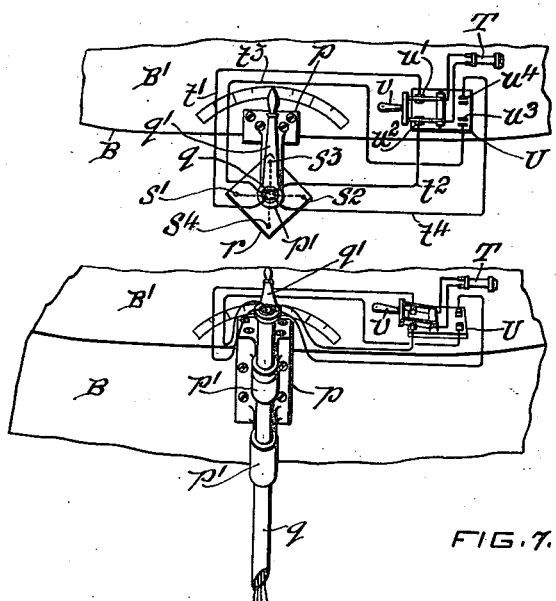

Figures 1 and 2 are diagrammatic views of a preferred embodiment of my invention wherein the guiding agent consists of an insulated electric conductor located in a river-channel and through which an alternating or interrupted current is caused to flow. Fig. 3 is a diagrammatic representation of a river-channel, showing the method of arranging the channel-conductor relatively to the supply-circuit on shore. Fig. 4 is a view, partly in detail elevation and partly in diagram, of the means carried by the vessel for ascertaining its position with relation to the conductor, Fig. 5 being a similar view to Fig. 4 of the same means, but showing some of the parts in plan view. Fig. 6 is a view illustrating a modified embodiment of my invention wherein the guiding agent consists of a pair of bare terminal wires or conductors of a direct-current circuit the electrical connection between which is made through the water. Fig. 7 is a view, partly in detail perspective elevation and partly in diagram, of the means carried by the vessel for ascertaining its position relatively to the guiding agent shown in Fig. 6; and Fig. 8, a detail plan view of the parts shown in Fig. 7; and Fig. 9 is a diagram of a modified arrangement of the guiding system formed by two electric conductors.

The generators, conductors, indicator-coils, direct contacts, and telephones hereinafter referred to are and may be of any type well known to those skilled in the art of electrical construction.

In the embodiment of my invention illustrated in Figs. 1, 2, 3, 4, and 5 a single insulated conductor $a$ is laid along the center of a river-channel $b$, preferably in sections several miles in length, and the ends of each section are connected through magnetically-screened branch wires $c$ and $d$ to the terminal wires $f$ and $g$, respectively, (see Fig. 3,) of an alternator (indicated at A) or other means of producing a variable electric current. The magnetic screening of the wires $c$ and $d$ may be effected by surrounding same with iron or other suitable material, preferably in the form of tubes $h$. The means carried by the vessel B whereby the steersman can ascertain the position of the ship relative to the guiding agent or conductor, will now be fully described.

Referring to Figs. 4 and 5, a base-plate or bracket 1 is secured to the deck B′ and located to overhang the stern of the vessel, such bracket carrying an upright pedestal or shaft 2, arranged in such a way as to always remain in a vertical position notwithstanding the rolling of the ship, the preferable arrangement consisting of a spherical formation 3 upon the base of the pedestal, fitting a socket 4 in the bracket, and a weight 5, pendent from the spherical formation. Upon the shaft 2 is mounted so as to be capable of rotation a collar 6, having a horizontal spindle 6ª and a vertical arm 6ᵇ projecting therefrom, the horizontal spindle 6ª being adapted to carry rotatably upon it one, $j$, of a pair of coils $j\,j'$ and the arm 6ᵇ to carry rigidly the second, $j'$, of said coils. The collar 6 on the pedestal 2 also carries a pointer 7 to indicate upon a stationary dial 8, carried by the pedestal, while another pointer 9 is secured upon the spindle $6^a$ to indicate upon a second dial 10, carried by the arm $6^b$. The terminals of each of the coils $j\ j'$ are connected to the terminals of telephones $k\ k'$, respectively, and thus form separate closed circuits in which sounds will be created or not, according to the position of each coil relatively to the guiding agent or conductor, as will now be explained.

I have indicated in Figs. 1 and 4 by arcs $x$, concentric with the cable $a$, the lines of magnetic force emanating from same and constituting an active field, as will be readily understood, and normally with the vessel directly above the cable and longitudinally in the same vertical plane therewith the coils and pointers on the ship will be in the respective positions shown in Figs. 4 and 5— i. e., one coil, $j'$, standing vertically athwartship, the other, $j$, lying horizontally fore and aft, with its axis in the same vertical plane as the keel-line of the ship, and each pointer directed to such vertical plane common to the axis of the cable and the vessel-keel, but of course the one, 7, pointing horizontally and the other, 9, vertically. With the parts in such position the coil $j'$ is tangent to the lines of the active field and the coil $j$ is in the plane of such lines, with the result that no sound can be heard in either telephone, and consequently the ship is known to be in its proper position relatively to the cable; but should sounds be heard by the steersman in one or the other or both telephones it will mean that the ship has veered from the course and in so doing placed the coils obliquely to the lines of the active field, thus creating the sounds. It will now be necessary to turn the coils to such a degree as will bring them into their initial relation to the lines of the active field, the accomplishment of which will be indicated by a cessation of the sounds in the telephones, and having established such proper relation the pointers will indicate upon the dials the direction of divergence of the ship from the course and also the location of the cable, so that with such information the vessel can be directed aright.

Instead of an alternator producing an alternating current in the cable, as above mentioned, a direct-current dynamo or other source of continuous electromotive force with a make-and-break current can be also used with equal advantage.

I will now describe, having reference to Figs. 6, 7, and 8, a modification of the invention, in which the guiding agent consists of a pair of bare conductors carrying direct or alternating current, electrical connection between which is made through the water, and in this case also the conductors are shown divided into sections representing several miles in length and between which are set up stream lines of electric flow constituting an active field. As each electrical field is the same as every other, I have shown one only and parts of two others, (see Fig. 6,) but will describe the complete one. $m$ is one of the bare conductors laid along the bed of the river to one side of the channel and connected by insulated branch wire $m'$ to the terminal $m^2$ of a short circuit supplied with direct or alternating current by any suitable dynamo (indicated at C) and $n$ is the other bare conductor laid at the opposite side of the channel and connected by branch $n'$ to the other terminal $n^2$ of the shore-circuit, B indicating the vessel situated above the active field between the two wires $m$ and $n$. I have indicated by curved lines $x$ in Fig. 7 the stream-lines constituting the active field created between the two wires $m$ and $n$, and I will now describe the means carried by the vessel for ascertaining the latter's position relatively to such field. A bracket $p$, secured to the deck B' of the vessel, overhangs the stern and furnishes bearings $p'\ p'$ for a vertical tube $q$, rotatably mounted in said bearings and of a length to enable a contact device upon its lower end to reach the active field. The contact device consists of a square plate $r$, secured, as shown, in a horizontal position to the end of the tube $q$ and having depending therefrom four bare wires or fingers $s'\ s^2\ s^3\ s^4$, each wire passing through and being secured to a corner of the plate, although insulated therefrom, and also being connected by insulated wires $t'\ t^2\ t^3\ t^4$, extending upward through the tube $q$ to contacts $u'\ u^2\ u^3\ u^4$ of a switchboard U on deck. The tube $q$ is adapted to be turned in its bearings by means of a handle or lever $q'$ at its upper end to change the position of the fingers of the contact device relatively to the active field for a purpose to be presently described, and the switchboard U is provided with a switch key or lever $v$, adapted to connect the terminals of a telephone T with a pair of the contacts $u'\ u^2$ or $u^3\ u^4$, which connect with and correspond to pairs of the contact $s'\ s^2$ or $s^3\ s^4$, arranged diagonally of the plate $r$. By means of the contact device and other means just described the vessel's position relative to the guiding agent (the two conductors $m$ and $n$) can readily be ascertained as follows: Imagining the points of the respective pairs $s'\ s^2$ and $s^3\ s^4$ of the contact-fingers as connected by imaginary lines, it will be seen that the imaginary line of the pair $s'\ s^2$ (and therefore such pair) is at right angles to the stream-lines $x$ of the active field, as shown in Fig. 7, so that no difference of potential will exist between the fingers $s'\ s^2$, and so no sound will be produced in the telephone while the imaginary line of the fingers $s^3\ s^4$ is parallel, and such fingers will experience a maximum difference of potential, and so create a maximum sound in the telephone, the variation in such maximum sound indicating position of ship with respect to the pair of conductors.

In Fig. 9 I have represented the shore-circuit which supplies the two conductors as divided into independent sections, so that should any break occur in one section the others will not be affected.

Although I have described my invention applied to a river and a vessel following a channel therein, it can with equal advantage be applied to a coast-line, hidden shoals, or the like, and a sea-going vessel, or used for guidance of any traveling object in any predetermined course.

It is obvious that beneficial results can be obtained from either embodiment of my invention and that other particular means can be used, and changes may be made in the particular arrangement and combination of the several parts without departing from the spirit of my invention. What I have illustrated, however, sufficiently enables those skilled in the art of electrical construction to put my invention into practice.

What I claim is as follows:

1. In apparatus for ascertaining position relative to a prearranged guiding system, a submerged electric conductor located along the course to be followed by a vessel, a shore-circuit connected with and supplying the submerged conductor with a current adapted to create a magnetic field within which the vessel moves, and a double-coil indicating device carried by the vessel, adapted to be affected by said magnetic field, whereby the vessel's position relative to the submerged conductor may be ascertained.

2. In apparatus for ascertaining position relative to a prearranged guiding system, a pair of electric conductors laid along the bed of a river-channel, or course followed by a vessel, a shore-circuit connected with and supplying the conductors with a current adapted to create an electric field within which the vessel moves, and a coil indicating device with telephones connected therewith carried by the vessel adapted to be affected by said electric field whereby the vessel's position relative to the electric field may be ascertained.

3. In apparatus for ascertaining position relative to a prearranged guiding system, a submerged electric conductor located along the course to be followed by a vessel, a shore-circuit connected with and supplying the submerged conductor with a current adapted to create a magnetic field within which the vessel moves, and a set of instruments carried by said vessel and comprising a coil indicating device carrying suitable dials and pointers, and telephones connected with said coils for the purpose set forth.

4. In apparatus for ascertaining position relative to a prearranged guiding system, a submerged electric conductor located along the course to be followed by a vessel, a shore-circuit connected with and supplying the submerged conductor with a current adapted to create a magnetic field within which the vessel moves, and a set of instruments carried by said vessel and comprising two coils with their axes at an angle of ninety degrees to each other, both coils adapted to rotate horizontally about a common vertical axis and one of them to rotate about a horizontal axis with suitable dials, pointers, and telephones for the purpose set forth.

5. In apparatus for ascertaining position relative to a prearranged guiding system, a pair of electric conductors laid along the bed of a river-channel, or course followed by a vessel, a shore-circuit connected with and supplying the conductors with a current adapted to create an electric field within which the vessel moves, and a set of instruments carried by said vessel and comprising a switchboard, a telephone connected therewith, a depending contact device with fingers adapted to enter the electric field, connections between said fingers and said switchboard and means for turning the depending contact device about a vertical axis for the purpose set forth.

In testimony whereof I have affixed my signature in presence of two witnesses.

ROBERT BOWIE OWENS.

Witnesses:
 OWEN N. EVANS,
 FRED J. SEARS.